Jan. 5, 1965     H. W. LOVE ETAL     3,164,147
FRICTION HEAT GENERATOR
Filed Feb. 9, 1962     2 Sheets-Sheet 1
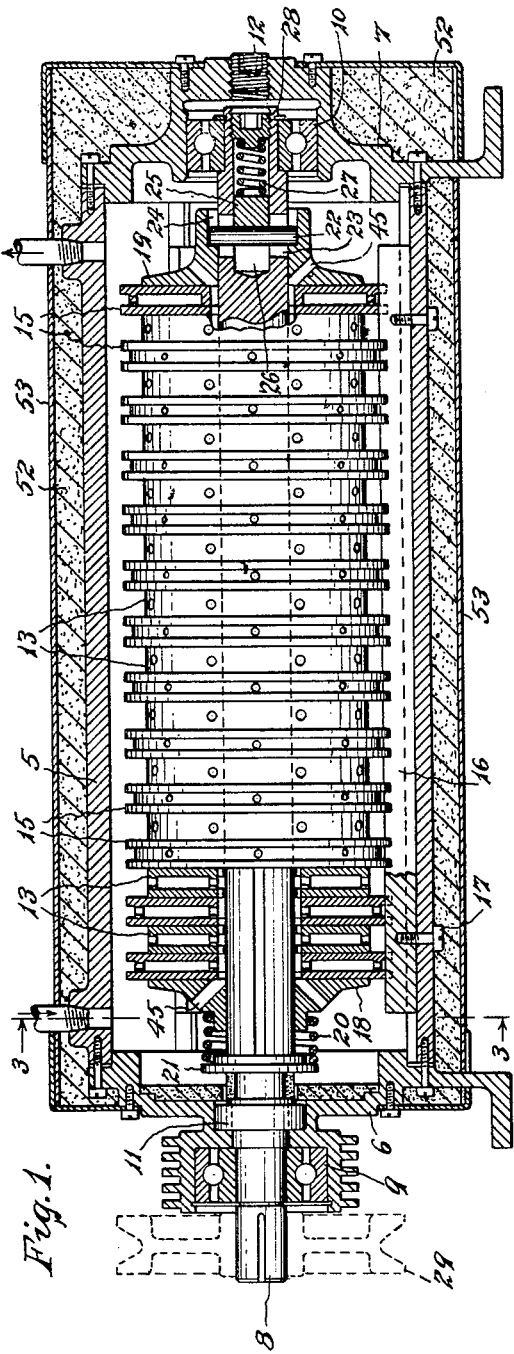
INVENTOR.
HERBERT W. LOVE.
BY ALFRED H. TULLY.
Louis V. Lucia
ATTORNEY.

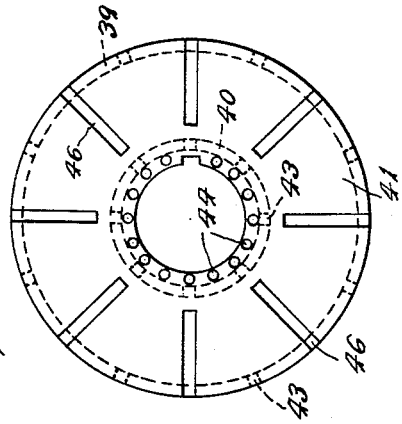

United States Patent Office 3,164,147
Patented Jan. 5, 1965

3,164,147
FRICTION HEAT GENERATOR
Herbert W. Love, Waterfront Park, South Coventry, Conn., and Alfred H. Tully, 1600 W. Main St., Willimantic, Conn.
Filed Feb. 9, 1962, Ser. No. 172,229
13 Claims. (Cl. 126—247)

This invention relates to a friction heat generator of the type fully described in U.S. Patent to Love et al. No. 2,625,929 of January 20, 1953.

It has been found that such friction heat generators, as heretofore constructed, have been slow to heat due to the bulkiness in the assembly of the parts in frictional contact for generating the heat.

It is therefore an object of this invention to provide a friction heater in which a heat transfer medium, such as oil, is heated within a plurality of heating chambers by contact with surfaces of walls which are in direct heat conducting relation to the friction surfaces which actually generate the heat in said assembly.

A further object of the present invention is to provide certain improvements in such friction heat generators for greatly increasing the heating efficiency thereof.

Further objects and advantages of this invention will be understood from the following description and the accompanying drawings in which:

FIG. 1 is a side view, in central vertical section, of a friction heat generator embodying our present invention.

FIG. 2 is an end view thereof.

FIG. 3 is a sectional end view on line 3—3 of FIG. 1.

FIG. 4 is an enlarged side view in central vertical section, showing a pair of the contacting stationary and rotatable friction discs embodied in the present invention.

FIG. 5 is an elevational end view of the stationary disc shown in FIG. 4.

FIG. 6 is a similar view of the rotating disc.

FIG. 7 is a sectional end view of a modified form of rotatable disc.

FIG. 8 is a reduced elevational view showing an application of said heat generator.

FIG. 9 is a sectional side view showing a further modified form of rotatable discs.

As shown in the drawing, our improved friction heat generator includes a casing comprising a cylinder 5 having an end plate 6 secured to one end thereof and another end plate 7 secured to its opposite end. A drive shaft 8 is journaled in suitable bearings 9 and 10 in the end plates 6 and 7, respectively.

The interior of the casing 5 is sealed at its ends by a suitable sealing ring 11, in the end plate 6, and a plug 12 in the end plate 7.

About the shaft 8 there is mounted a series of friction discs including rotatable friction discs 13, which are slidably keyed to said shaft by a key 14 to be rotated thereby, and stationary friction discs 15 which are disposed between said discs 13. The said stationary friction discs 15 surround the shaft 8 and are slidably keyed to and spaced from the wall of the cylinder 5 by spline bars 16, that fit within slots in said cylinder wall, and the stationary discs, and are secured to the casing by screws 17.

Said stationary and rotatable friction discs are forced together into frictional contact with each other by friction pressure plates 18 and 19. The plate 18 is slidably keyed to the shaft 8 by the key 14 and forced against the adjacent stationary friction disc by a compression spring 20 which surrounds the shaft 8 and is anchored thereto by a thrust collar 21 that is secured to said shaft.

The pressure plate 19 is slidably keyed to the shaft 8 by a key pin 22 that extends through a slot 23 crosswise in said shaft and projects into notches 24—24 in said pressure plate. A follower 25 is slidably contained in an axial bore 26, in the end of the shaft 8 adjacent to said pressure plate 19, and is urged against the pin 22 by a compression spring 27 to force the said pressure plate 19 into frictional engagement with the stationary friction disc 15 adjacent thereto.

The said spring 27 is anchored to the shaft by means of a plug 28 that is threaded to the bore 26 and is adjustable for varying the pressure between said series of stationary and rotatable friction discs on said shaft.

It will be understood that when the drive shaft 8 is rotated by power connected thereto by suitable means, such as a pulley 29, the series of rotatable discs 13 will rotate with said shaft against the adjacent stationary discs and thereby create friction and generate heat which will heat all of the said discs 13 and 15 and the pressure plates 18 and 19.

In order to transfer the generated heat from said friction discs, the interior of said casing is filled with a suitable heat transfer medium, such as oil, which may be circulated through a coil 30 for heating water, air or the like.

To derive maximum efficiency from the heat generated by the friction between the stationary and rotatable series of discs, 13 and 15, each of said discs is constructed to provide a heating chamber within the disc that is contained between the walls that have the friction surfaces of the disc thereon, and passages are provided for circulating the oil in said casing through said heating chambers.

As shown in FIGS. 4 to 6, the stationary discs illustrated is preferably constructed of a disc shaped wall portion 31 having annular flanges 32 and 33. A separate flat disc shaped wall portion 34 is brazed or otherwise secured to said annular flanges and thereby providing a heating chamber 35. The said wall portions and flanges have openings 36 and 37, respectively, therein to allow the oil to circulate through said heating chamber.

The rotatable disc shown in FIG. 4 is similarly constructed of a disc shaped wall portion 38 having the concentric annular flanges 39 and 40 and the wall portion 41 brazed thereto and forming the heating chamber 42 therebetween. The said flanges 39 and 40 are also provided with openings 43 to circulate the oil through the heating chamber 42. To admit the oil to the openings 43, the said wall portions 38 and pressure plates 18 and 19 are provided with openings 44 and 45, respectively, around the drive shaft 8.

The opposite sides of said rotatable discs have a series of radial slots 46 therein which communicate with the holes 36 in the contacting side walls of the stationary discs to aid in the circulation of the oil.

In the modified form of rotating disc shown in FIG. 7, the peripheral flange 47 of said disc has tubes 48 projecting inwardly into the chamber 49 of said disc. Scoops 50 are provided in said flange to force the oil to circulate through said tubes into the heating chamber 49 and therefrom through the openings 51 in the flange 47 while said disc is being rotated in the direction indicated by the arrow in said FIG. 7.

In the modified form of rotatable friction disc shown in FIG. 9, the said disc is provided with impeller blades 54 whereby the centrifugal action from the rotation of said disc will cause the oil to be drawn into the heating chamber 49 through the openings 43–a and forced out through the openings 43–b and thus aid in circulating said oil through said heating chamber.

Our improved heat generator is insulated with a suitable insulating material 52 to minimize heat loss.

A jacket 53 is provided to confine said material against the exterior of the generator.

In the operation of said heat generator, the shaft 8 is driven by a suitable source of power such as an electric motor. Said shaft will then rotate all of the rotatable discs 13 and the friction between said rotatable discs and the stationary discs 15 will generate heat in accordance with the amount of pressure applied to all of the discs by the springs 20 and 27.

The heat thus generated will heat the oil contained within said generator as it circulates through the heating chambers 35 and 42 of the stationary and rotating discs, respectively. The heated oil can then be circulated from said heat generator to a heat transfer element, such as the heating coil 30.

It is noted that, in the form of the stationary disc shown in FIG. 4, the slots 46 will function to pull the oil through the holes 36 in the stationary discs by centrifugal action caused by the rotation of the rotating discs 13. Said slots will also serve to contact the oil with the co-acting friction surfaces between the stationary and rotating disc where the heat is generated and thereby aid in heating said oil.

In the form of rotatable disc shown in FIG. 7, rotation of said disc will cause the oil to be scooped by the scoops 50 and forced through the tubes 48 into the heating chamber 49 from which it will pass outwardly through the holes 51.

It will be understood from the above description that by providing the oil heating chamber within the stationary and rotating friction discs, wherein said oil will come in heating contact with the walls of said chambers which are in direct heat conducting relation with the contacting heat generating friction surfaces of said stationary and rotatable discs, the efficiency of our heat generator is greatly increased.

The oil supplied to the friction surfaces between the stationary and rotatable friction discs will be heated both by the friction between said surfaces and the pressure applied to the oil molecules by the compression springs 20 and 27 and the said oil will also serve to lubricate the friction surfaces and thus reduce the amount of power required for driving our improved heat generator and further increase the efficiency thereof to generate a maximum amount of heat for the power consumed.

We claim:

1. A friction heat generator including a casing having end walls, a drive shaft journaled in said end walls, a plurality of stationary friction discs keyed to said casing, a plurality of rotatable friction discs keyed to said shaft to be driven thereby and disposed between said stationary discs in frictional contact therewith, said stationary and rotatable discs having spaced side walls and inner and outer concentric annular walls forming heating chambers therein, said discs being formed with openings extending through said walls communicating with said chambers.

2. A friction heat generator including a casing, a drive shaft journaled in said casing, a plurality of stationary friction discs keyed to said casing and surrounding said shaft in spaced relation thereto, a plurality of rotatable friction discs keyed to said shaft and disposed between said stationary discs in frictional contact therewith, said stationary and rotatable discs each having spaced side walls and inner and outer concentric annular walls arranged to form a heating chamber therein, said side walls and said inner annular wall being spaced from said shaft, said annular walls formed with passages therein communicating with said heating chamber, said rotatable discs having passages in their side walls between said shaft and inner annular wall communicating with said heating chamber through the passages in said inner annular wall.

3. A friction heat generator including a casing, a drive shaft journaled in said casing, a series of friction discs about said shaft including a plurality of stationary discs keyed to said casing, a plurality of rotatable friction discs disposed between said stationary discs and keyed to said shaft to be rotated thereby, each of said stationary and rotatable discs comprising a pair of spaced disc shaped side walls, the said side walls of the stationary discs having an axial bore larger than said shaft to provide a passage therebetween, the said side walls of the rotatable discs being slidably keyed to the shaft, each of said friction discs having an inner annular wall spaced from said shaft and an outer annular wall adjacent to the outer periphery of the disc, the said annular walls providing a heating chamber between the side walls of each friction disc, means defining radial passages in said inner and outer annular walls communicating with said heating chamber, a pair of friction pressure plates slidably keyed to said drive shaft and in frictional contact with the opposite ends of said series of friction discs, and spring means anchored to said shaft and urging said pressure plates against the respective friction discs, the said rotatable discs being formed with passages in the side walls thereof adjacent to said shaft and communicating with the space between the inner annular wall of said rotatable discs and said shaft, thereby communicating with the respective heating chambers through the passages in said inner annular wall.

4. A friction heat generator including a casing, a drive shaft journaled in said casing, a series of friction discs about said shaft including a plurality of stationary discs slidably keyed to said casing and a plurality of rotatable discs slidably keyed to said shaft for rotation therewith, each of said rotatable discs comprising a pair of spaced disc shaped side walls, spaced inner and outer annular walls between said side walls, said side and annular walls forming a heating chamber therebetween, the said outer annular wall having a series of tubes extending radially therefrom into said heating chamber, scoop portions in said outer annular wall leading into said tubes, and means defining outlet passages from said heating chamber through said outer annular wall.

5. A friction heat generator including a casing, a drive shaft journaled in said casing, a series of friction discs about said shaft including a plurality of stationary friction discs secured to said casing and a plurality of rotatable friction discs between and in frictional contact with said stationary discs and secured to said shaft to be rotated thereby, each of said rotatable discs comprising a pair of spaced side walls, spaced inner and outer annular walls between said side walls and therewith forming a heating chamber, means defining passages in said inner and outer annular walls communicating with said heating chamber, and vanes in said heating chamber for causing circulation of a liquid through the passages in said inner annular wall into said chamber and outwardly therefrom through the passages in said outer annular wall.

6. A friction heat generator including a casing, a drive shaft journaled in said casing, a series of contacted friction discs about said shaft including stationary discs secured to said casing and rotatable discs driven by said shaft, said stationary and rotatable discs each having spaced side walls and inner and outer concentric annular walls arranged to form a heating chamber in each disc, said spaced side walls having outer heat generating friction surfaces whereby said heating chambers may be heated through said side walls by heat generated at said friction surfaces.

7. A friction heat generator including a casing, a drive shaft journaled in said casing, a plurality of stationary friction discs slidably keyed to said casing, a plurality of rotatable friction discs slidably keyed to said shaft to be driven thereby and disposed between said stationary discs in frictional contact therewith, said stationary and rotatable discs each having spaced side walls and inner and outer annular walls arranged to form a heating chamber in each of said discs between said side walls, and means defining openings in the walls of said discs communicating with said chambers.

8. A friction heat generator as set forth in claim 7 wherein the side walls of said stationary friction discs are provided with passages communicating with the heating chamber thereof.

9. A friction heat generator as set forth in claim 7 wherein the side walls of said stationary discs are provided with passages communicating with the heating chamber thereof, and means defining radial slots in the side walls of said rotatable discs communicating with said passages.

10. A friction heat generator including a casing, a rotatable drive shaft journaled in said casing and formed with an axial bore in one end portion thereof, a series of friction discs about said shaft including a plurality of stationary friction discs keyed to said casing and surrounding said shaft and a plurality of rotatable friction discs selectively disposed between said stationary discs and keyed to said shaft to be driven thereby, a friction pressure plate at each of the opposite ends of, and in contact with, said series of friction discs, said pressure plates being keyed to the shaft for rotation relative to the friction discs in frictional contact therewith, adjustable spring means biasing said pressure plates against the opposite ends of said series of friction discs for urging them into frictional contact with each other, aid adjustable spring means including a first compression spring means surrounding said shaft and secured thereto at one end of said series of friction discs and a second compression spring means at the opposite end of said series disposed within said axial bore for rotation with said shaft.

11. A friction heat generator as set forth in claim 10 wherein said second compression spring means includes a compression spring in said axial bore, a key pin extending through said shaft disposed in diametrically opposed longitudinal slots formed therein and communicating with said bore to permit longitudinal movement of said pin in said slots relative to the shaft, said pin having its ends engageable with the respective pressure plate and disposed in diametrically opposed notches formed therein for slidably keying said plate to the shaft for rotation therewith, a follower in said bore disposed between said pin and said compression spring whereby said spring biases said follower axially against said pin, and a plug threaded to said bore adjustably securing said spring within the bore to vary the biasing force applied thereby to said key and therethrough to said pressure plates and said series of friction discs.

12. A friction disc generator as set forth in claim 3 wherein the said pressure plates are provided with passages communicating with the space between said shaft and inner annular walls and thereby communicating with the heating chambers in said series of friction discs through the passages in said inner annular walls and said side walls.

13. The subject matter set forth in claim 4 wherein the said side walls of the stationary friction discs are formed with openings extending therethrough and the outer surface of the side walls of said rotatable friction discs are provided with radial slots communicating with the openings in the side walls of the stationary friction discs.

References Cited by the Examiner
UNITED STATES PATENTS

| 248,625 | 10/81 | Wells | 126—247 X |
| 854,720 | 5/07 | Dawson | 126—247 X |
| 1,650,612 | 11/27 | Denniston | 126—247 X |
| 2,625,929 | 1/53 | Love et al. | 126—247 |
| 2,727,594 | 12/55 | Ganster | 188—90 |

FOREIGN PATENTS

| 567,582 | 2/45 | Great Britain. |

JAMES W. WESTHAVER, *Primary Examiner.*
FREDERICK L. MATTESON, Jr., *Examiner.*

UNITED STATES PATENT OFFICE
CERTIFICATE OF CORRECTION

Patent No. 3,164,147 January 5, 1965

Herbert W. Love et al.

It is hereby certified that error appears in the above numbered patent requiring correction and that the said Letters Patent should read as corrected below.

Column 5, line 18, for "aid" read -- said --.

Signed and sealed this 4th day of May 1965.

(SEAL)
Attest:

ERNEST W. SWIDER
Attesting Officer

EDWARD J. BRENNER
Commissioner of Patents